(12) United States Patent
Courtright et al.

(10) Patent No.: US 9,073,586 B1
(45) Date of Patent: Jul. 7, 2015

(54) TRANSVERSE SILL REINFORCEMENT FOR A TRUCK BED AND METHOD OF MAKING A SILL REINFORCEMENT

(71) Applicant: Ford Global Technologies, LLC, Dearborn, MI (US)

(72) Inventors: Mark Joseph Courtright, Allen Park, MI (US); Joshua Hemphill, White Lake, MI (US); Vincent Chimento, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/317,562

(22) Filed: Jun. 27, 2014

(51) Int. Cl.
*B62D 25/20* (2006.01)
*B62D 33/077* (2006.01)
*B62D 29/00* (2006.01)
*B23P 15/00* (2006.01)

(52) U.S. Cl.
CPC ............ *B62D 33/077* (2013.01); *B62D 29/008* (2013.01); *B23P 15/00* (2013.01); *B23P 2700/50* (2013.01)

(58) Field of Classification Search
CPC .... B62D 21/15; B62D 25/04; B62D 25/2054; B62D 25/025; B62D 25/2036; B62D 21/157; E04C 2003/0439; Y10T 29/49826; B01D 2046/2496; B62B 21/08
USPC ............... 296/184.1, 187.09, 187.03, 187.08, 296/187.12, 193.07, 209
See application file for complete search history.

(56) References Cited

U.S. PATENT DOCUMENTS

| | | | | |
|---|---|---|---|---|
| 3,321,236 A | * | 5/1967 | Sewelin | 296/35.1 |
| 4,252,068 A | * | 2/1981 | Nolan | 105/420 |
| 5,085,485 A | * | 2/1992 | Wurl | 296/204 |
| 5,560,674 A | * | 10/1996 | Tazaki et al. | 296/193.01 |
| 5,653,495 A | * | 8/1997 | Bovellan et al. | 296/203.03 |
| 6,053,564 A | * | 4/2000 | Kamata et al. | 296/187.09 |
| 6,193,306 B1 | * | 2/2001 | Lee | 296/209 |
| 6,217,109 B1 | * | 4/2001 | Okana et al. | 296/203.03 |
| 6,386,625 B1 | * | 5/2002 | Dukat et al. | 296/209 |
| 7,588,285 B2 | | 9/2009 | Mohammed | |
| 7,631,918 B2 | * | 12/2009 | Yasukouchi et al. | 296/30 |
| 7,819,463 B2 | | 10/2010 | Werner | |
| 8,702,160 B2 | * | 4/2014 | Kurogi et al. | 296/205 |
| 8,708,390 B2 | * | 4/2014 | Kurogi et al. | 296/30 |
| 8,925,991 B2 | * | 1/2015 | Caliskan et al. | 296/29 |
| 2002/0043821 A1 | * | 4/2002 | Takashina et al. | 296/203.03 |
| 2006/0097533 A1 | * | 5/2006 | Watanabe et al. | 296/30 |
| 2010/0109382 A1 | * | 5/2010 | Dajek et al. | 296/193.04 |
| 2010/0109385 A1 | * | 5/2010 | Yamada et al. | 296/209 |
| 2013/0049405 A1 | * | 2/2013 | Kurogi et al. | 296/203.01 |
| 2013/0049408 A1 | * | 2/2013 | Kurogi et al. | 296/209 |
| 2015/0008703 A1 | * | 1/2015 | Furusaki et al. | 296/187.08 |

\* cited by examiner

*Primary Examiner* — Kiran B Patel
(74) *Attorney, Agent, or Firm* — Raymond L. Coppiellie; Brooks Kushman P.C.

(57) ABSTRACT

A sill reinforcement assembly is provided for a sill area of a pick-up truck bed that is supported on and connected to a pair of frame rails. A unitary one-piece aluminum reinforcement is secured to the frame rails below the pick-up truck bed by a frame bolt fastener. The unitary reinforcement includes a continuous tubular receptacle for the frame bolt. One or more transverse walls of the reinforcement are connected by one or more bridging walls to the tubular receptacle. The transverse walls are connected by one-sided fasteners to a laterally extending wall of transverse beams. The frame bolt extends through the truck bed floor, the tubular receptacle, the transverse beam and is secured to the frame rails below the pick-up truck bed.

5 Claims, 4 Drawing Sheets

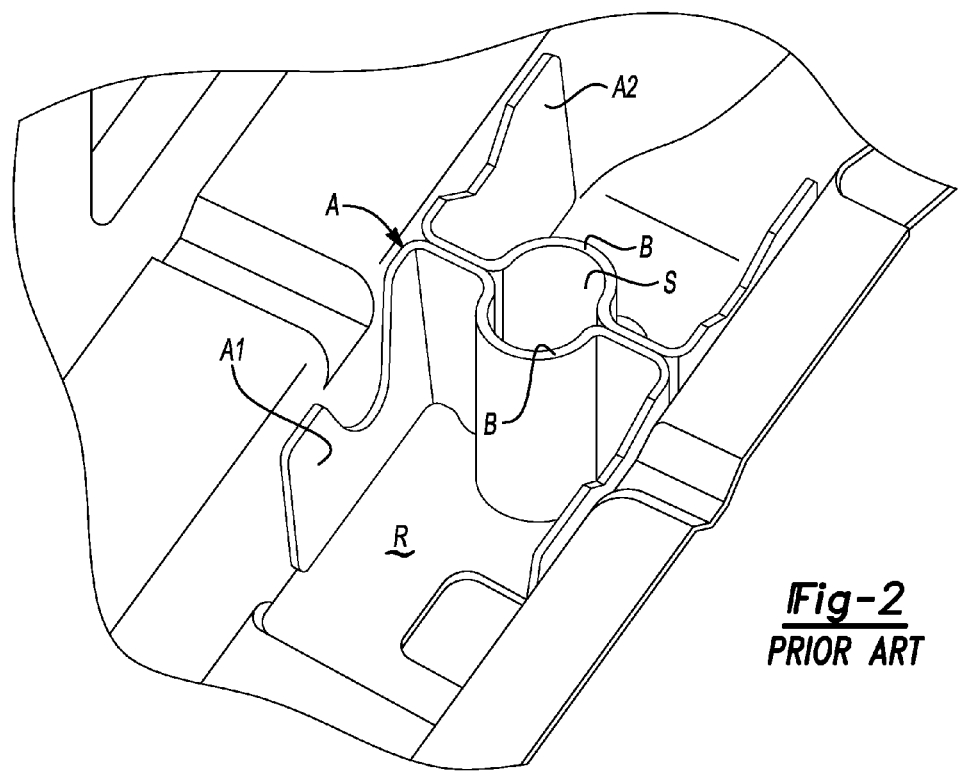
Fig-2
PRIOR ART
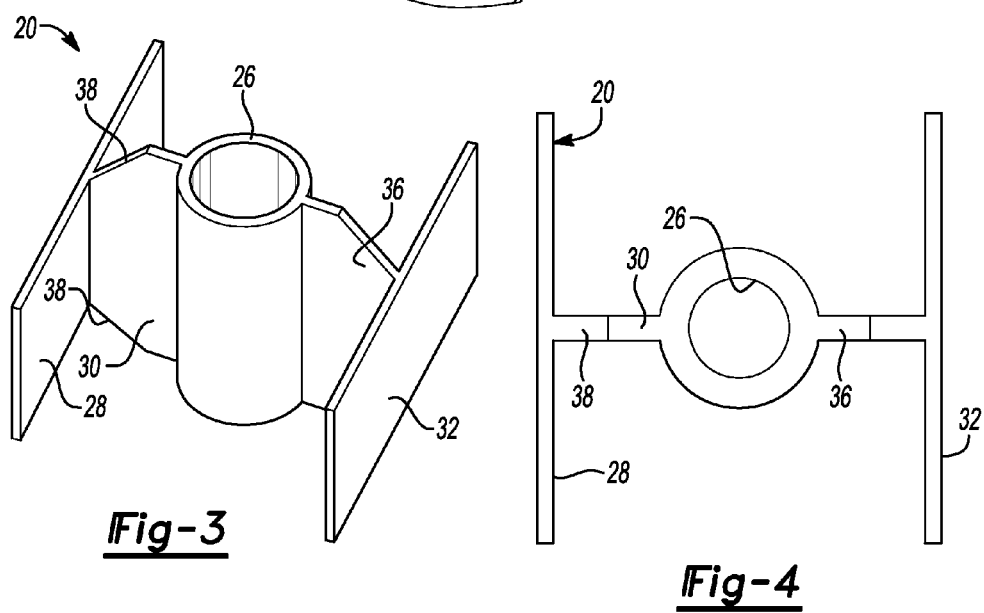
Fig-3
Fig-4

TRANSVERSE SILL REINFORCEMENT FOR A TRUCK BED AND METHOD OF MAKING A SILL REINFORCEMENT

TECHNICAL FIELD

This disclosure relates to a reinforcement for a laterally extending sill for a front or rear edge of a pick-up truck bed that is attached to the frame rails and a method of manufacturing and assembling the reinforcement to the truck bed.

BACKGROUND

Pickup trucks are motor vehicles with a rear open top cargo area often referred to as a bed. Pickup trucks are popular largely because the bed allows them to be utilized in so many different ways, including carrying a variety of types of cargo and towing various types of trailers. Traditionally the majority of body structures on pickup trucks have been formed from steel alloys. Through years of experience, pickup truck designers have learned how to design steel truck body parts that withstand the variety of demanding pickup truck applications. The current regulatory and economic environment have increased the importance of making pickup trucks more fuel efficient as well as functional and durable. One way to reduce the fuel consumption of a vehicle, especially when unloaded, is to reduce the weight of the vehicle body.

Aluminum alloys generally have a higher strength to weight ratio than steel alloys. Replacing steel with aluminum offers a substantial potential for weight reduction. However, the elastic modulus of aluminum is generally lower than the elastic modulus of steel. Fabrication techniques and methods of joining and reinforcing parts that work well for steel parts may not work well for the same aluminum part. Due to these and other differences, simple material substitution does not necessarily produce an acceptable design.

As shown in FIG. 2, a prior art sill structure for a pick-up truck is illustrated that is formed from steel that is reinforced with a two part stamped steel bracket assembly "A" that is adapted to receive a bolt through a space "S" formed by two semi-circular bends "B". A bolt (not shown) attaches the bracket assembly "A" to a frame rail "R." The two part steel bracket "A1" and "A2" must be pre-assembled and welded together off-line. The assembled steel bracket is then welded to a crossbar and the front sill of the pick-up truck bed. Disadvantages of this prior art reinforcement include the fact that multiple parts are required, multiple assembly operations must be performed and the reinforcement is relatively heavy compared to an aluminum part.

Steel brackets may not work as well with aluminum body structure components as with steel body structure components, often requiring the steel brackets to be coated or have other additional processes performed on them or the receiving aluminum structure. Accordingly it would be advantageous to have a structural reinforcement configured to transfer and manage the loads between the pickup box and the frame that also works well with aluminum body structures. It may also be advantageous for the structural reinforcement to aid in preventing adjacent aluminum panels from cracking or deforming due to road load inputs from the frame and cargo loading from the bed. It may also be advantageous for the structural reinforcement to be able to withstand the clamp load of the box to frame bolts.

The above problems and other problems are addressed by this disclosure as will be summarized below.

SUMMARY

According to one aspect of this disclosure, a reinforcement assembly for a sill area of a pick-up truck bed that is supported on a pair of frame rails comprises a unitary one-piece reinforcement and a frame rail fastener. The unitary one-piece reinforcement includes a continuous tubular receptacle for the fastener, a transverse wall that engages a laterally extending surface of a transverse beam disposed adjacent the truck bed, and a bridging wall that extends between the receptacle and the transverse wall.

According to other aspects of this disclosure, the unitary one-piece reinforcement may be an aluminum extrusion.

The transverse wall may be a first transverse wall and the bridging wall may be a first bridging wall, and the assembly may further comprise a second transverse wall that engages a second laterally extending wall of a beam attached to the truck bed that is disposed is a spaced relationship relative to the first transverse wall. A second bridging wall extends between the receptacle and the second transverse wall. The first and second transverse walls may be in parallel vertical planes extending in a lateral vehicle direction. The first bridging wall and the second bridging wall may extend in a longitudinal direction from diametrically opposed locations on the tubular receptacle. As used herein, the terms lateral and longitudinal refer to lateral and longitudinal vehicle directions.

The reinforcement may be disposed below the truck bed and the truck bed may define a hole that is aligned with the tubular receptacle. The fastener is inserted through the hole and the tubular receptacle and is secured to the frame rail. The transverse wall is secured by a plurality of single sided fasteners to the laterally extending surface of the transverse beam.

The sill area may be a front sill area or a rear sill area. The transverse wall of the beam in the front sill area may be attached to the cab of the pick-up truck.

According to another aspect of this disclosure, a reinforcement assembly is provided for a sill area of a pick-up truck bed that is supported on a pair of frame rails. The reinforcement assembly comprises a fastener adapted to be secured to one of the frame rails and a unitary one-piece reinforcement. The reinforcement includes a continuous tubular receptacle for the fastener, a transverse wall that engages a laterally extending surface of a transverse beam disposed adjacent the truck bed, and a pair of spaced apart bridging walls extending between the receptacle and the transverse wall.

The transverse wall of the reinforcement assembly may include a first transverse wall and the pair of bridging walls may include a first pair of bridging walls. The assembly may further comprise a second transverse wall that engages a laterally extending wall of a beam attached to the truck bed that is disposed is a spaced relationship relative to the transverse beam, and a second pair of spaced apart bridging walls that extend between the receptacle and the second transverse wall.

The first pair of bridging walls and the second pair of bridging walls may be configured to form an X-shaped array centered on the tubular receptacle.

The reinforcement assembly may further comprise a laterally extending wall of a beam attached to the truck bed that is disposed is a spaced relationship relative to the transverse beam, and a second pair of bridging walls extending between the receptacle and the second transverse wall. The first and second pairs of transverse walls may be secured by a plurality of single sided fasteners to one laterally extending surface of the transverse beam and the laterally extending wall of the beam that is attached to the truck bed.

According to another aspect of this disclosure, a method is disclosed for reinforcing a sill area of a bed of a pick-up truck. The method comprises the steps of assembling a cab of the pick-up truck to a set of frame rails and assembling a plurality of laterally extending beams to the frame rails. A one-piece unitary aluminum reinforcement is extruded to simultaneously form a continuous tubular receptacle in the reinforcement. The reinforcement is assembled between the cab and one of the beams. The reinforcement is secured to the cab and the one beam with one-side fasteners. The bed is then secured to the reinforcement and to one of the frame rails with a fastener that extends through the bed, the tubular receptacle, and into the frame rail.

According to another aspect of the method, the step of extruding the reinforcement may further comprise cutting the extrusion into predetermined lengths after it is extruded.

The above aspects and other aspects of this disclosure are described below in greater detail with reference to the attached drawings.

BRIEF DESCRIPTION OF THE DRAWINGS

FIG. 2 is a fragmentary perspective view of a sill reinforcement assembly made according to a prior art design;

FIG. 3 is a perspective view of an extruded sill reinforcement made according to one aspect of this disclosure;

FIG. 4 is a top plan view of the sill reinforcement shown in FIG. 3;

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
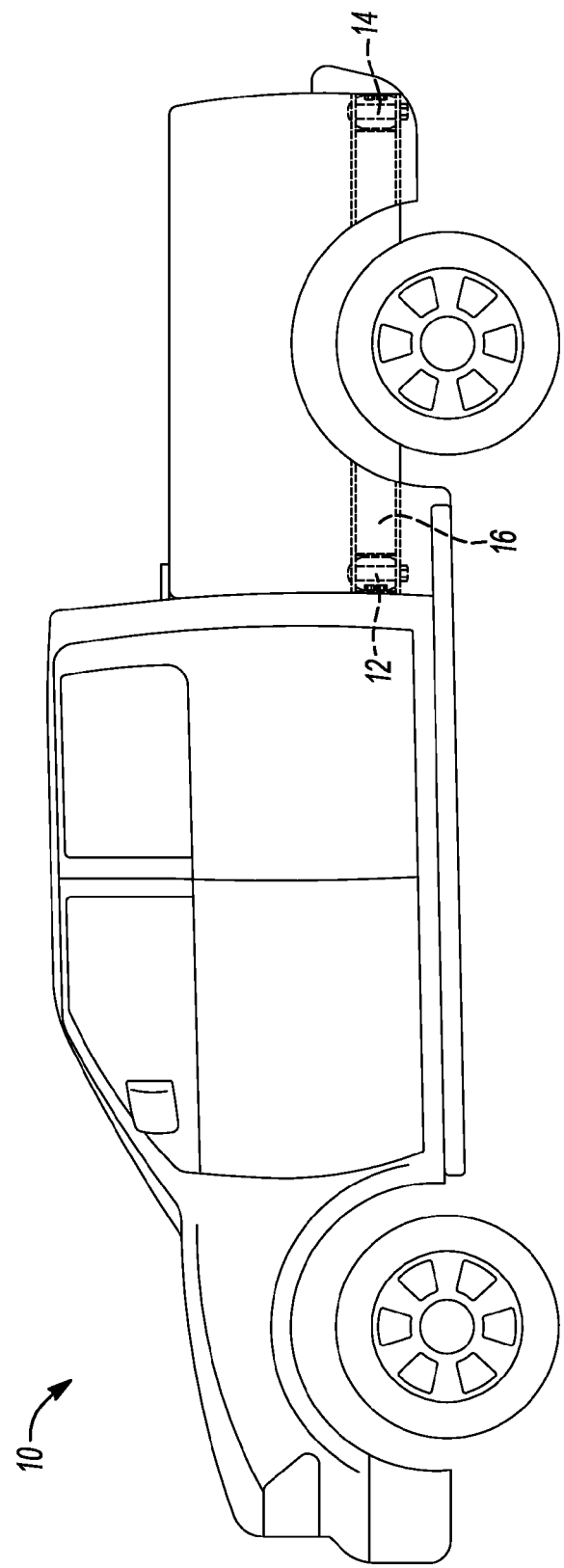
FIG. 1 is a left side elevation view of a crew cab pick-up truck including sill structural reinforcements.

Referring to FIG. 1, a pick-up truck 10 is shown that includes a front sill reinforcement 12 attached to a sill area 14 of the pick-up truck bed. A rear sill reinforcement 16 is also shown in phantom for reinforcing the rear portion of a pick-up truck bed. The sill reinforcements 12 and 16 are supported by and connected to a frame rail 18 of the pick-up truck 10.

Referring to FIGS. 3 and 4, one embodiment of a unitary, one-piece reinforcement is generally indicated by reference numeral 20. The reinforcement 20 includes a continuous tubular receptacle 26 that is connected to a first transverse wall 28 by a first bridging wall 30. A second transverse wall 32 is connected to the continuous tubular receptacle 26 by a second bridging wall 36. The one-piece reinforcement shown in FIGS. 3 and 4 is an extruded part that is extruded from aluminum or another alloy material to provide a lightweight, durable and robust reinforcement. The extruded reinforcement is extruded to close tolerances and is dimensionally stable.

The outer portions of the first and second bridging walls 30, 36 have tapered outer portions on an upper and a lower part of the walls. In the embodiment shown in FIGS. 3 and 4, the first and second transverse walls 28, 32 have a reduced vertical height compared to the height of the tubular receptacle 26. By reducing the height of the first and second transverse walls 28, 32 and providing the tapered outer portions 38, additional weight savings are achieved while providing a tubular receptacle 26 that conforms to the spacing available between the truck bed and the transverse rail mounted on the frame rail (shown in FIG. 1).

Figure 5:
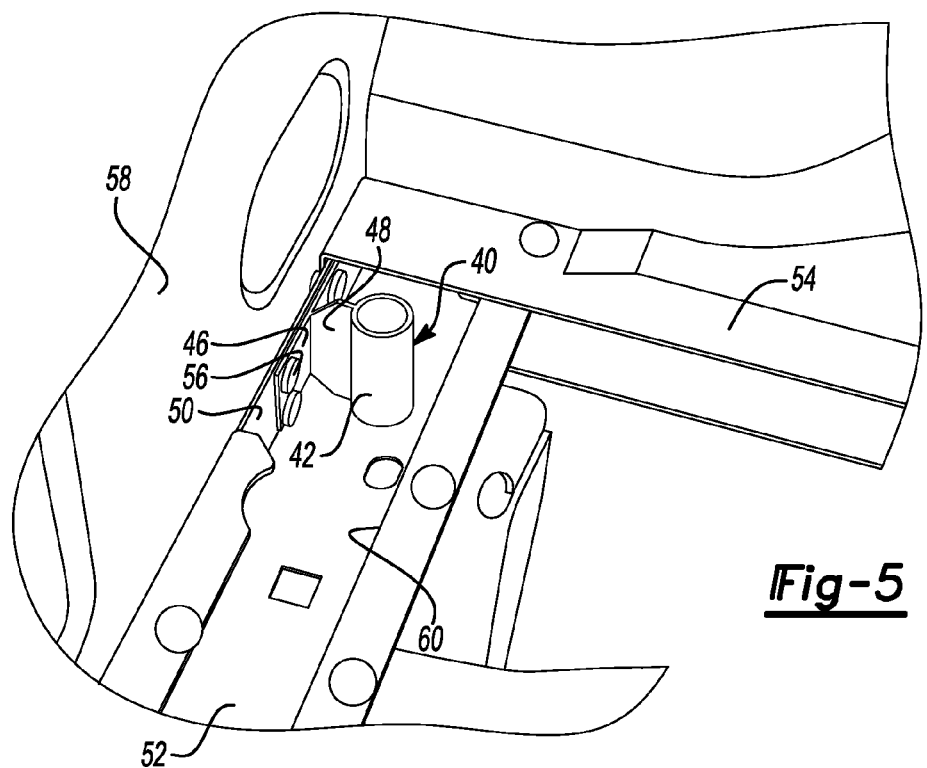
FIG. 5 is a fragmentary perspective view of another embodiment of the sill reinforcement according to this disclosure shown installed on the pick-up truck bed support structure.
Figure 6:
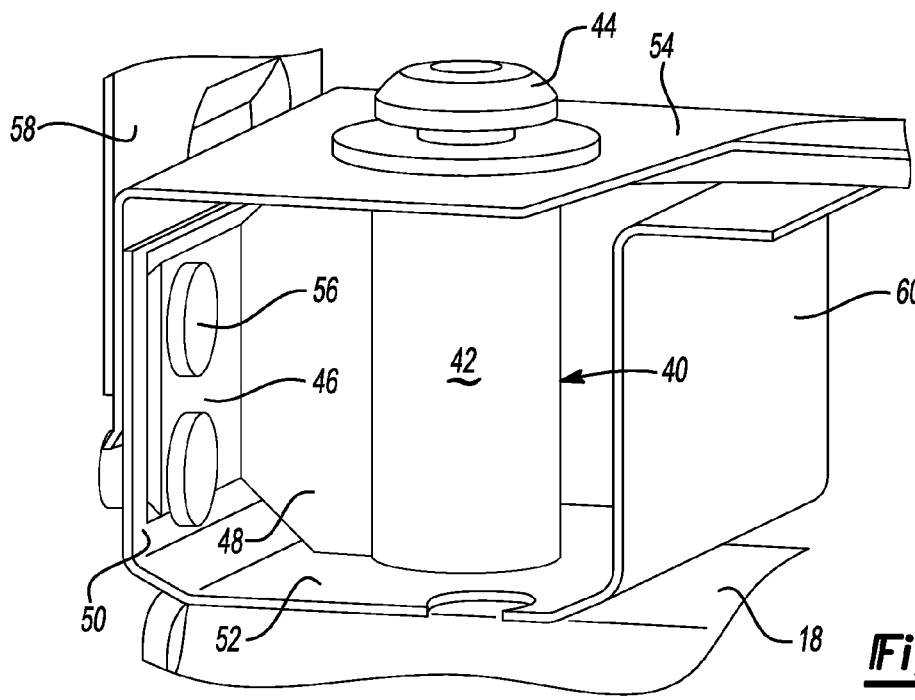
FIG. 6 is a fragmentary perspective view of the embodiment of a sill reinforcement shown in FIG. 5.

Referring to FIGS. 5 and 6, another embodiment of a unitary one-piece reinforcement is generally indicated by reference numeral 43. The one-piece reinforcement 40 includes a tubular receptacle 42. With specific reference to FIG. 6, a frame bolt 44 is shown extending through the tubular receptacle 42 to attach the one-piece reinforcement 40 to a frame rail 18.

The tubular receptacle 42 is connected to a transverse wall 46 by a bridging wall 48. The transverse wall 46 is secured to a laterally extending wall 50 of a transverse beam 52 that supports the truck bed floor 54. The frame bolt 44 extends through the truck bed floor 54 that defines an opening (not shown), through the tubular receptacle 42, and through a hole (not shown) in the transverse beam 52. The frame bolt 44 is then secured to the frame rail 18 that may include a weld nut (not shown) or other threaded member or portion of the frame rail 18 that secures the frame bolt 44 to the frame rail 18.

The transverse wall 46 is secured to the laterally extending wall 50 by a plurality of self-piercing rivets 56. It should be noted that other one-sided fasteners or clinch joint connections may also be used to secure the transverse wall 46 to the laterally extending wall 50. It is also conceivable that two-sided fasteners may be used to secure the transverse wall 46 to the laterally extending wall 50. The self-piercing rivets 56 may also extend through the laterally extending wall 50 to secure the reinforcement 40 and transverse beam 52 to the rear wall of a cab portion 58 of the pick-up truck 10.

A second laterally extending wall 60 is shown in FIGS. 5 and 6 that may be used to provide additional support for the one-piece reinforcement 20 shown and described with reference to FIGS. 3 and 4. The second transverse wall 32 shown in FIGS. 3 and 4 may be attached to the second laterally extending wall 60 shown in FIGS. 5 and 6 to provide additional support for the reinforcement 20.

Figure 7:
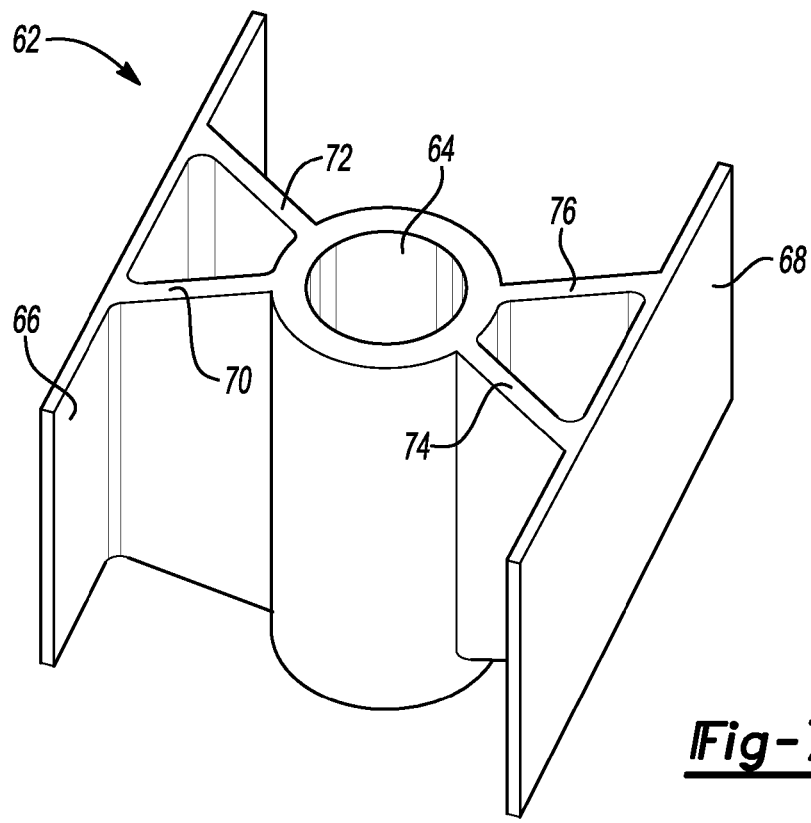
FIG. 7 is a perspective view of an alternative design for a sill reinforcement made according to another embodiment of this disclosure.

Referring to FIG. 7, another alternative embodiment of a sill reinforcement is disclosed that comprises an X-shaped reinforcement 62. The X-shaped reinforcement 62 includes a tubular receptacle 64 for a frame bolt (as shown in FIG. 6). A first transverse wall 66 and a second transverse wall 68 are provided on opposite sides of the tubular receptacle 64 and are adapted to be connected to a first laterally extending wall 50 and a second laterally extending wall 60 that are shown in FIGS. 5 and 6. A first inner bridging wall 70 and a first outer bridging wall 72 extend radially outwardly from the tubular receptacle 64 to the first transverse wall 66. A second inner bridging wall 74 and a second outer bridging wall 76 extend between the second transverse wall 68 and the tubular receptacle 64. The outer bridging wall 72 and second inner bridging wall 74 are aligned to form an X-shape that intersects with the tubular receptacle 64.

Figure 8:
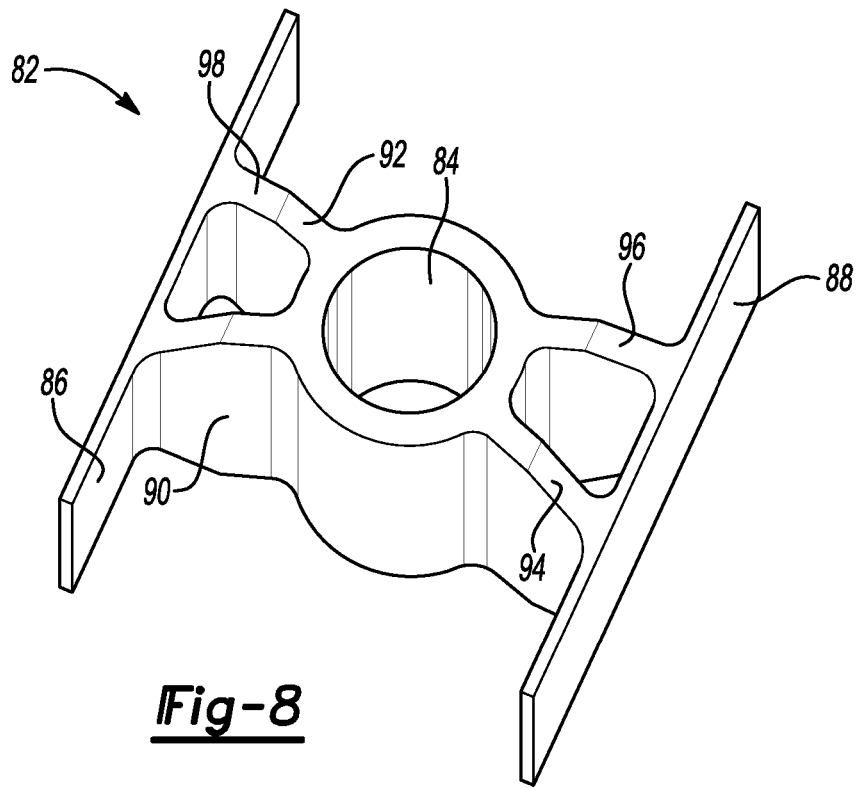
FIG. 8 is a perspective view of an alternative design for a sill reinforcement made according to another embodiment of this disclosure.

Referring to FIG. 8, a double wall reinforcement is generally indicated by reference numeral 82. The double wall reinforcement 82 includes a tubular receptacle 84. A first transverse wall 86 and a second transverse wall 88 are connected to the tubular receptacle 84 by bridging walls, as will be described below. A first inner bridging wall 90 and a first outer bridging wall 92 connect the tubular receptacle 84 to the first transverse wall 86. A second inner bridging wall 94 and a second outer bridging wall 96 connect the tubular receptacle 84 to the second transverse wall 88. The double wall reinforcement 82 shown in FIG. 8 is also generally X-shaped like the embodiment shown in FIG. 7. However, the bridging walls connect to the tubular receptacle 84 at more widely spaced locations. The double wall reinforcement embodiment 82 also includes tapered outer portions 98 similar to those previously described with reference to the tapered outer portions 38 shown in the embodiment of FIGS. 3 and 4.

The embodiments of FIGS. 7 and 8 provide increased reinforcement of a sill area compared to the embodiment shown in FIGS. 3 and 4 above and also in the embodiment shown in FIGS. 5 and 6 above. The embodiments of FIGS. 7 and 8 may be used if additional reinforcement is required compared to the structures disclosed in connection with FIGS. 3-6.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A reinforcement assembly for a pick-up truck bed sill spanning a pair of frame rails, comprising:
    a fastener adapted to be secured to one of the frame rails; and
    a unitary one-piece reinforcement including a continuous tubular receptacle for the fastener, a transverse wall that engages a laterally extending surface of a transverse beam disposed adjacent a truck bed, and a pair of spaced apart bridging walls extending between the receptacle and the transverse wall.

2. The reinforcement assembly of claim 1 wherein the transverse wall is a first transverse wall and the pair of bridging walls is a first pair of bridging walls, and the assembly further comprises a second transverse wall that engages a laterally extending wall of a beam attached to the truck bed that is disposed in a spaced relationship relative to the transverse beam, and a second pair of spaced apart bridging walls extend between the tubular receptacle and the second transverse wall.

3. The reinforcement assembly of claim 2 wherein the first pair of bridging walls and the second pair of bridging walls form an X-shaped array centered on the tubular receptacle.

4. The reinforcement assembly of claim 1 further comprising a second laterally extending wall of the transverse beam that is disposed in a spaced relationship relative to the transverse wall, and a second pair of bridging walls extend between the tubular receptacle and a second transverse wall, wherein the transverse wall and second transverse wall are secured by a plurality of single sided fasteners to the laterally extending wall and the second laterally extending wall of the transverse beam.

5. The reinforcement assembly of claim 1 wherein the sill is a front sill and the transverse wall is attached to a cab of the pick-up truck.

\* \* \* \* \*